United States Patent [19]

Wohrstein et al.

[11] Patent Number: 5,133,492
[45] Date of Patent: Jul. 28, 1992

[54] METHOD AND APPARATUS FOR SEPARATING THIN-WALLED, MULTIPORT MICRO-EXTRUSIONS

[75] Inventors: Franz X. Wohrstein, Park Ridge; Roger Paulman, Barrington, both of Ill.

[73] Assignee: Peerless of America, Incorporated, Chicago, Ill.

[21] Appl. No.: 630,278

[22] Filed: Dec. 19, 1990

[51] Int. Cl.$^5$ .................... B26D 3/02; B23D 21/00
[52] U.S. Cl. ........................... 225/2; 225/96.5; 225/101
[58] Field of Search .............. 29/DIG. 33, 726, 564.6; 225/2, 4, 96.5, 101

[56] References Cited

U.S. PATENT DOCUMENTS

| | | |
|---|---|---|
| 1,366,063 | 1/1921 | Culhane, Jr. ........................... 225/2 |
| 3,112,559 | 12/1963 | Pauls . | |
| 3,254,400 | 6/1966 | Gordon . | |
| 3,679,109 | 7/1972 | King, Jr. ........................... 225/2 |
| 4,216,004 | 8/1980 | Brehm et al. ........................... 225/96.5 X |
| 4,562,628 | 1/1986 | Marneffe et al. ........................... 225/2 X |
| 4,565,244 | 1/1986 | O'Connor et al. ........................... 165/181 |

FOREIGN PATENT DOCUMENTS 837623  6/1981  U.S.S.R. .............................. 225/101

Primary Examiner—Frank T. Yost
Assistant Examiner—Rinaldi Rada
Attorney, Agent, or Firm—Emrich & Dithmar

[57] ABSTRACT

A method for separating a thin-walled multiport extrusion into a plurality of micro-tubes for use as single pass lengths in a heat exchanger assembly, the method including the steps of threading the micro-extrusion into a clamping device including first and second sets of clamping blocks which hold the micro-extrusion rigidly while the clamping blocks of the clamping device are drawn in opposite directions on opposite sides of a groove cut in the upper and lower walls of the extrusion, tearing the extrusion apart along cutting lines formed in the upper and lower walls of the extrusion during the separation process.

14 Claims, 2 Drawing Sheets

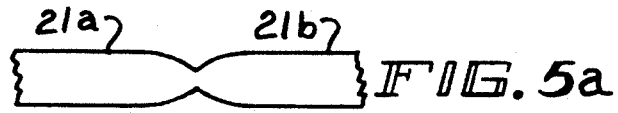
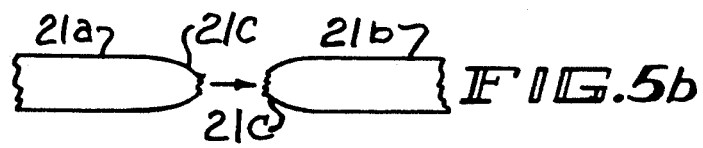
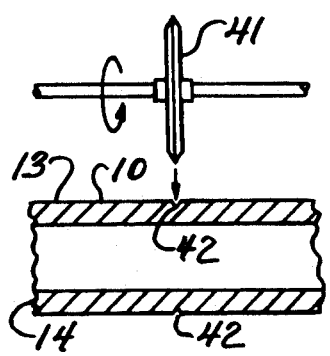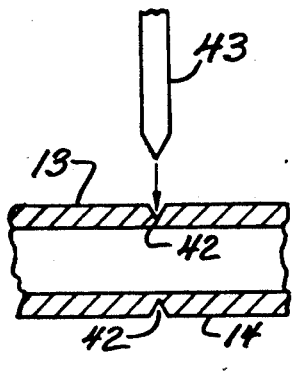
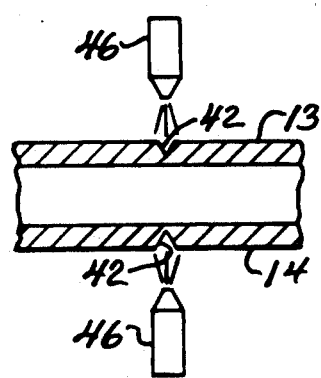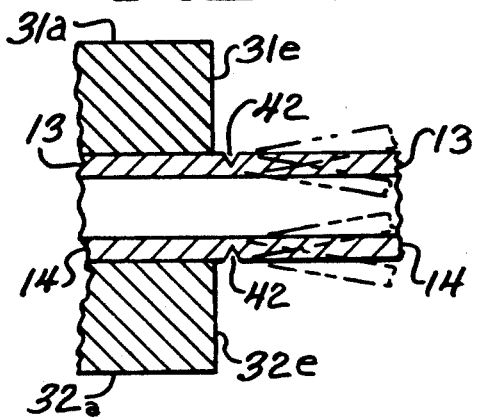

METHOD AND APPARATUS FOR SEPARATING THIN-WALLED, MULTIPORT MICRO-EXTRUSIONS

BACKGROUND OF THE INVENTION

The present invention relates to heat exchanger assemblies, and more particularly to a method and apparatus for separating sections of thin-walled multiport micro-extrusions to provide micro-tubes for use in heat exchanger assemblies.

In order to produce heat exchanger assemblies that are of extremely high efficiency, lightweight and economical, heat exchanger assemblies are being produced which employ a thin-walled multiport condenser tube. The small condenser tube, hereinafter referred to as a micro-tube, is a very small oval tube approximately one-half inch to one inch in width and 0.050 inches to 0.100 inches in thickness and having a multitude of minute ports, typically ten to twenty in number within the tube. The condenser tube is formed using an extrusion process which provides a micro-extrusion typically a hundred feet or more in length. The micro-extrusion is cut into sections of usable length, typically twenty to thirty inches long. A plurality of such micro-tubes are assembled together with a suitable heat transfer array such as, for example, folded fin units, which are positioned between parallel passes of the micro-tubes. Such heat exchanger assemblies provide a condenser of extremely high efficiency while being extremely lightweight and economical in the use of material.

The use of the micro-tubes as a condenser tube in a heat exchanger assembly has mandated that the micro-tube be made as an extrusion, preferably of aluminum. In such an extrusion, preferably of aluminum, the micro-tube with its minute ports is produced from a solid billet and the ports are formed from solid material. In the extrusion process, the inside of the micro-tube and its ports are completely devoid of any contamination.

Known arrangements for providing such micro-tubes in the desired pass lengths involves the use of saw cutting to cut extruded lengths of thin-walled multiport tubing to the desired lengths. A major problem with such separation method is that metal cuttings, or particles, and cutting lubricants penetrate the openings, or ports in the tubing, plugging the openings. Because of the microscopic size of the individual ports, it is an extremely difficult task to remove such contamination from the ports. Due to the end use of the product, namely a refrigeration condenser or heat exchanger, it is essential that no foreign matter enter the heat exchanger during its fabrication.

It would therefore be highly desirable to have a method and apparatus for parting extruded, extremely thin-walled multiport micro-tubes into single predetermined lengths, without the use of saws to cut tubular stock to sections of the desired lengths, cutting lubricants, or other conventional means which require breaching the ports during the separation process.

SUMMARY OF THE INVENTION

It is therefore a primary object of the present invention to provide a method and apparatus for parting micro-extrusions of extremely thin-walled, multiport heat exchanging tubing without closing or restricting the ports or openings and without introducing foreign matter into the ports.

A method in accordance with the present invention includes threading or positioning of the micro-tube stock into a clamping device which holds the micro-tube rigidly during the operation of the clamping device and which sizes the height dimension of the tubing. The clamping means is then moved laterally in opposite directions, drawing the micro-tube apart along a cutting line formed in the upper and lower surfaces of the micro-tube. The cutting line may be formed either by the clamping means or by separate scoring means. Depending on the wall thicknesses involved and the port wall thicknesses, the lateral movement of the clamping means is less than about 0.25 inches. Due to the pull apart feature and the elongation characteristics of the present invention, the metal in the uncut or unscored wall and port walls tends to neck down into a bell mouth shape, which shape is highly advantageous in aiding the flow of liquid or gases from the manifold into or out of the micro-tube with minimal pressure drop. Also, the integrity of the inside of the micro-tube is maintained without restriction to flow. Moreover, the cleanliness and noncontamination of the inside of the micro-tube is maintained during the cleavage operation.

The invention consists of certain novel features and structural details hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE DRAWINGS

For the purpose of facilitating and understanding the invention, there is illustrated in the accompanying drawings a preferred embodiment thereof, from an inspection of which, when considered in connection with the following description, the invention, its construction and operation, and many of its advantages will be readily understood and appreciated.

FIG. 5 is a fragmentary view of a webbing of the micro-tube which defines the ports through the micro-tube;

FIG. 5a illustrates the webbing during the separation process illustrating the necking down of the micro-tube to form a bell mouth shape in accordance with the present invention;

FIG. 5b illustrates the section of the webbing separated in accordance with the present invention; and FIGS. 6, 6a, 6b and 6c illustrate steps in another method of separating a micro-extrusion into sections of micro-tube for a heat exchanger assembly in accordance with the present invention.

DESCRIPTION OF THE PREFERRED EMBODIMENT

Figure 1:
FIG. 1 is a top plan view of a thin-walled multiport micro-tube for use in a heat exchanger assembly.
Figure 2:
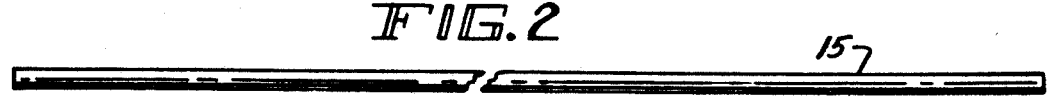
FIG. 2 is a side elevational view of the micro-tube illustrated in FIG. 1.
Figure 3:
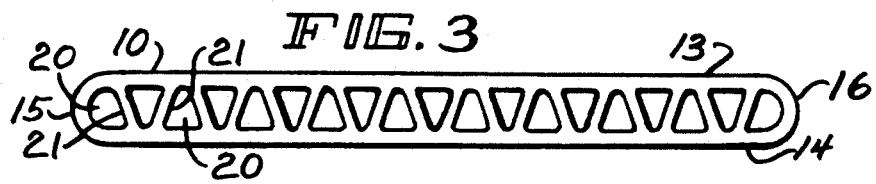
FIG. 3 is an enlarged end view of the micro-tube illustrated in FIG. 1, showing the ports which extend through the micro-tube.

Referring now to the drawings wherein like numerals have been used throughout the several views to designate the same or similar parts in FIGS. 1-3, there is illustrated a thin-walled, multi-port micro-tube 10 for use in a heat transfer assembly. The micro-tube 10 consists of an oval tube approximately one-half to one inch in width and 0.050 inches to 0.100 inches in thickness. The micro-tube 10 has a first end 11 and a second end 12, a top or upper wall 13 and a bottom or lower wall 14 and side walls 15 and 16. The micro-tube includes a plurality of minute ports or channels 20 which extend substantially in a parallel spaced relation between the ends 11 and 12 of the micro-tube 10. The ports 20 are defined by a plurality of webs 21 which extend, preferably diagonally, between the upper wall 13 and lower wall 14 of the micro-tube 10. The micro-tube 10 is extruded with its minute ports 20 from a solid billet and the ports 20 are formed from solid material. In the extrusion process the inside of the tube and the ports are formed, with the inside of the tubing being devoid of any contamination. The micro-tube is, preferably, made of aluminum because of its heat transfer characteristics. The aluminum metal is extruded into extremely long lengths and, using the methods and apparatus in accordance with the present invention, is separated or parted into single path lengths, typically ten inches to thirty inches without the use of cutting procedures that breach the ports and without the use of cutting lubricants or other foreign matter which could get into the ports or channels 20 during the separation procedure.

Figure 4A:
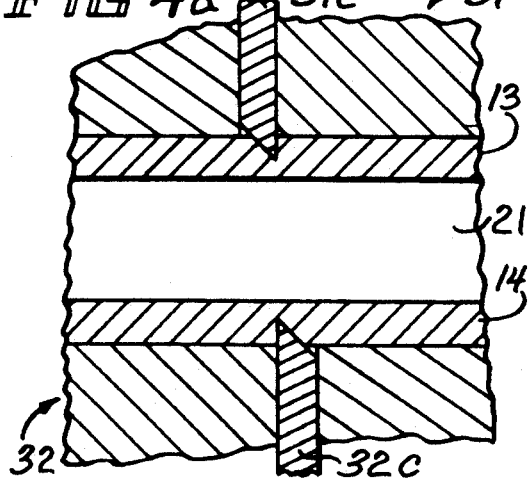
FIGS. 4a and 4b illustrate steps in the method of separating the micro-extrusion into sections using the apparatus illustrated in FIG. 4.
Figure 4:
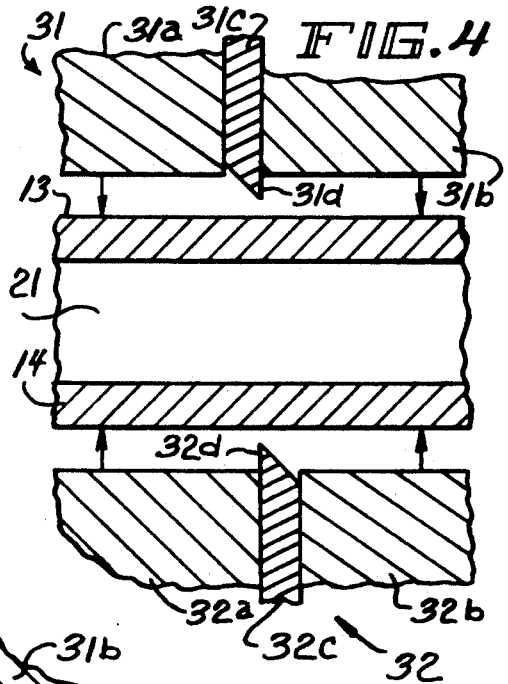
FIG. 4 is a simplified representation of apparatus for separating a micro-extrusion into sections to provide a plurality of micro-tubes for use as pass portions in a heat exchanger assembly.

Referring now to FIG. 4, in accordance with one method for separating a multiport micro-extrusion into sections to produce micro-tube lengths of ten inches to thirty inches, for example, a length of micro-extrusion is threaded into a clamping device including an upper clamping assembly 31 and a lower clamping assembly 32. The clamping device holds the extrusion rigidly during the separating operation and at the same time sizes the very critical height dimension of the micro-tube. The two clamping assemblies 31 and 32 are approximately twice the length of the tube pass desired, i.e., the length of the micro-tube 10. Both the clamping assemblies 31 and 32 are split at the center to define two blocks 31a and 31b, for assembly 31, and blocks 32a and 32b, for assembly 32. One of the block portions 31b has a knife blade 31c rigidly attached at the center of the block 31b with its knife edge 31d set at a depth of cut to penetrate the upper surface 13 of the tube 10 to about 60% of its thickness of the top wall of the tubing 10. The knife edge 31d is flat on one side and has a 45° angle on the opposite side of the blade. In practice, the depth of cut and the angle of sharpening of the blade can be slightly varied.

Similarly, the bottom clamping device 32 on the diagonally opposite side from the above clamping device 31 has a knife blade 32c carried by block 32a with its edge 32d being flat on one side and cut to 45° on the opposite side of the blade. Blade 32c is also set to penetrate the bottom wall 14 of the tube 10 to approximately 60% of its thickness. The blades 31c and 32c are set approximately opposed to each other with the flat sides of the cutter blades face to face in a straight line perpendicular to the material being cut.

Figure 4B:
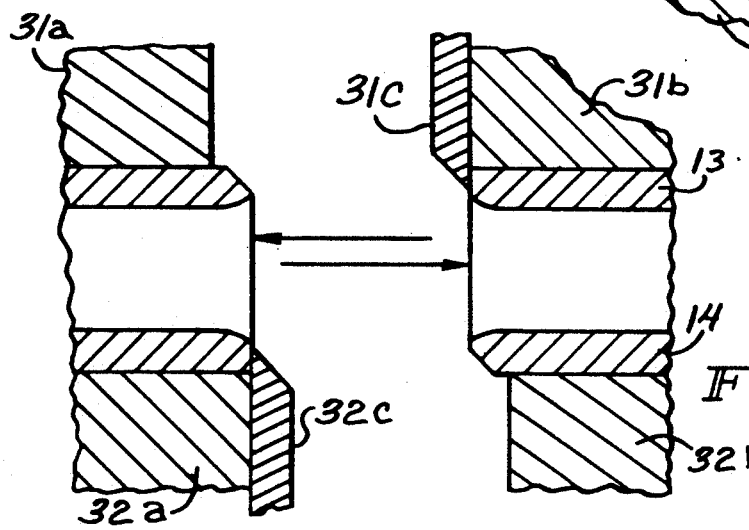

The clamping assemblies 31 and 32 are then moved in a direction perpendicular to the micro-extrusion until the blades 31c and 32c penetrate the top wall and bottom wall, respectively, of the micro-extrusion, the position illustrated in FIG. 4a. When the clamping assemblies 31 and 32 have reached the stop position, which is the exact tolerance of the finished tube height and is set by the depth to which the blades 31c and 32c are set, then the upper cutter blade 31c and the bottom cutter blade 32c have penetrated the top and bottom walls of the tube approximately 60% of the wall thickness respectively. Then the clamped blocks are moved laterally, with blocks 31b and 32b being moved to the right, as illustrated in FIG. 4b, and blocks 31a and 32a being moved towards the left, as illustrated in FIG. 4b. Depending on the wall thicknesses involved and the port wall thickness, the lateral movement is less than 0.25 inches. During this lateral movement, the remaining metal fails by exceeding its yield point, which is 20–40% in the case of aluminum.

Due to the pull apart feature and the elongation characteristics of the aluminum, the metal in the remaining wall and port webs such as web portion 21 illustrated in FIG. 5, tends to neck down from its original shape, illustrated in FIG. 5 to an intermediate stage defining web parts 21a and 21b as illustrated in FIG. 5a in tearing apart, and to a final stage after separating into two parts, 21a and 21b, with bell mouth shape tips 21c into a bell mouth shape, as illustrated in FIGS. 5b which is favorable from a flow entering and leaving standpoint. In use, a plurality of the micro-tubes 10 are inserted into headers or manifolds (not shown) in forming a finished condenser product. The bell mouth shape is very advantageous to flow of liquid or gases from a manifold into or out of the tubing with minimal pressure drop. In all cases, the integrity of the inside of the tube has been maintained. Also, the inside of the tube is devoid of contamination and the full opening is maintained without restriction to flow.

All elements including the webbing and the side portions, even though not cut by the severing tool, are torn apart with the axial drawing of the element. The inner channel is not breached by any cutting tool, lubricants or scraps or cuttings in this method to provide micro-tubes of a predetermined length that are completely devoid of contamination therein.

Referring now to FIG. 6–6c, in accordance with another method for separating the micro-extrusion into a plurality of sections to provide micro-tubes 10, the continuous micro-extrusion may be scored on both the upper wall 13 and the lower wall 14 using a suitable scoring apparatus 41 to provide a cut or slot 42 in the upper and lower walls, as shown in FIG. 6. In the alternative, the continuous micro-extrusion may be cut on both the upper wall 13 and the lower wall 14 utilizing a knife or blade means 43 to provide a cut or slot 42 in the upper and lower walls, as shown in FIG. 6a. The grooves or slots 42 in the upper and lower walls are cut to a depth of approximately 75% to 95% of the thickness of the upper and lower walls of the micro-extrusion. It is generally preferred that the scoring or cutting penetrate approximately 75% through the upper and lower walls to provide the slot or groove 42. However, it is important that the scoring or cutting of the upper and lower walls does not extend or penetrate through the wall thickness or the integrity of the inside of the tube will become contaminated.

Then, a high pressure air source 46 (FIG. 6b) is used to remove the metal slivers, particles or other contaminants which may be contained in the slots or grooves 42. A pair of clamping blocks 31a and 32a are clamped or applied to the upper and lower walls, respectively, with the ends 31e and 32e of the blocks 31a and 32a positioned adjacent the grooves 42. Thereafter, the free end portion of the micro-tube 10 is moved upwardly and downwardly in an increasing amplitude until the micro-tube is severed by this worrying action. As indicated previously, because of the pull-apart properties and the elongation characteristics, the junction or ends of the separation will be necked down into a bell shape, as illustrated in FIG. 5b. Also, the inside of the micro-tube 10 will be free of contamination and the entire opening is maintained without restriction to flow.

In each of the above-described methods for separating micro-extrusions into sections of micro-tube, the ports or inner channels are not breached during the separation process and no chips, slivers or other contamination or foreign materials are allowed to enter into the ports or channels during the process. Also, the processes do not restrict the channels or openings during the separation, the channels being maintained to their full opening without restriction to flow in use. The inner channels are not breached by the cutting tool, any lubricants or scraps or cuttings.

We claim:

1. A method of separating a thin-walled, multiport extrusion into sections of a micro-tube suitable for use as pass portions in a heat exchanger assembly, the extrusion having an upper wall and a lower wall, said method comprising the steps of:
   providing a groove in the upper wall of the extrusion to a depth less than the thickness of the upper wall,
   providing groove in the lower wall of the extrusion to a depth less than the thickness of the lower wall of the extrusion, the grooves in the upper and lower walls being aligned and extending transversely of the extrusion defining extrusion first and second portions, and
   drawing the extrusion first portion away from the extrusion second portion in a direction perpendicular to the groove with sufficient force to exceed the yield point of the material of the extrusion to thereby sever the extrusion first portion from the extrusion second portion.

2. The method according to claim 1, wherein drawing the extrusion first and second portions apart includes applying a first clamping means to the upper and lower walls of the extrusion first section and applying a second clamping means to the upper and lower walls of the extrusion second section, rigidly clamping the first clamping means to the extrusion first section and rigidly clamping the second clamping means to the extrusion second section and moving the first and second clamping means in opposite directions carrying with them the extrusion first and second sections clamped thereto.

3. The method according to claim 2, wherein providing the groove includes scoring the surfaces of the upper and lower walls of the extrusion.

4. The method according to claim 2, wherein providing the groove includes cutting a groove in the upper and lower walls of the extrusion.

5. The method according to claim 4, which includes cutting the groove to a depth of approximately 75% to 95% of the thickness of the upper and lower walls.

6. The method according to claim 2, wherein providing the groove includes extending the first and second cutting blades perpendicular to the surfaces of the upper and lower walls, respectively, of the tubing causing the cutting blades to penetrate the surfaces of the upper and lower walls to a depth of approximately 60%.

7. The method according to claim 6, wherein drawing the extrusion first and second portions apart includes using the cutting blades to push the extrusion portions in opposite directions.

8. The method according to claim 7, which includes aligning the cutting edges of the blades along an axis generally perpendicular to the upper and lower walls of the extrusion.

9. The method according to claim 6, which includes presetting the amount of extension of the cutting blade relative to the clamping means to thereby preset the depth of penetration of the blade into the extrusion upper and lower walls.

10. A method of separating a thin-walled multiport extrusion into sections of a micro-tube suitable for use as pass portions in a heat exchanger assembly, the extrusion having an upper wall and a lower wall, said method comprising the steps of:
    providing a groove in the upper wall of the extrusion to a depth less than the thickness of the upper wall,
    providing a groove in the lower wall of the extrusion to a depth less than the thickness of the lower wall of the extrusion, the grooves in the upper and lower walls being aligned and extending transversely of the extrusion defining extrusion first and second portions,
    applying a clamping means to the upper and lower walls of the extrusion first portion adjacent the grooves in the upper and lower walls, and
    reciprocating the extrusion second portion in a back and forth motion with sufficient force relative to the clamped first portion to exceed the yield point of the material of the extrusion to thereby sever the extrusion first portion from the extrusion second portion.

11. Apparatus for use in separating a thin-walled multiport extrusion into a plurality of sections of micro-tube for use in a heat exchanger, the extrusion having an upper wall and a lower wall, said apparatus comprising first clamping means including first and second separable clamping members, second clamping means including third and fourth separable clamping means, second cutting means carried by said second clamping means, second cutting means carried by said second clamping means, said first clamping means being positionable on said upper wall of said extrusion with said first cutting means penetrating said upper wall to a preselected depth along a first cutting line, defining first and second extrusion sections, and said second clamping means being positionable on said lower wall of said extrusion with said second cutting means aligned with said first cutting means and penetrating said lower wall a predetermined depth along a second cutting line which is substantially parallel to said first cutting line, said first and third clamping members defining a first clamping assembly which is rigidly clamped to said first extrusion section, and said second and fourth clamping members defining a second clamping assembly which is rigidly clamped to said second extrusion section, and means for moving said first clamping assembly in a first direction perpendicular to said cutting lines and said second clamping assembly in the opposite direction, whereby said first cutting means and said second cutting means pull said extrusion sections in opposite directions, pulling said first extrusion section away from said second extrusion section with sufficient force to exceed the yield point of the material of the extrusion to thereby sever said first extrusion section from said second extrusion section.

12. Apparatus according to claim 11 wherein said first cutting means includes a first cutting blade, each of said cutting blades having a tapered edge and a straight edge, the straight edges of the first and second cutting blades being aligned along an axis perpendicular through the extrusion and said cutting blades being oriented with their straight edges extending in opposite directions whereby the first and second cutting blades engage the extrusion on opposite sides of the axis.

13. Apparatus according to claim 12 wherein said tapered edge of each of said cutting blades tapers at an angle of approximately 45°.

14. Apparatus according to claim 13 wherein each of said cutting blades is associated with a different one of said clamping assemblies and is carried by one of the clamping members of the associated clamping assembly.

* * * * *

UNITED STATES PATENT AND TRADEMARK OFFICE
CERTIFICATE OF CORRECTION

PATENT NO. : 5,133,492
DATED : July 28, 1992
INVENTOR(S) : Wohrstein et al

It is certified that error appears in the above-identified patent and that said Letters Patent is hereby corrected as shown below:

Column 6, line 44, delete " means" and insert --members, first cutting means carried by said first clamping means, --

Column 6, line 46, delete "second cutting means carried by said second clamping means"

Column 7, line 5 after "blade" insert -- and said second cutting means includes a second cutting blade,--

Signed and Sealed this

Sixteenth Day of August, 1994

Attest:

BRUCE LEHMAN

Attesting Officer      *Commissioner of Patents and Trademarks*